(12) United States Patent
Suchar

(10) Patent No.: US 6,641,088 B2
(45) Date of Patent: Nov. 4, 2003

(54) PILOT CONTROLLED RELATIVE ANALGESIA SYSTEM FOR COMMERCIAL AIRLINES

(76) Inventor: Michael J. Suchar, 970 Capstan Dr., Forked River, NJ (US) 08731

( * ) Notice: Subject to any disclaimer, the term of this patent is extended or adjusted under 35 U.S.C. 154(b) by 0 days.

(21) Appl. No.: 10/208,342

(22) Filed: Jul. 31, 2002

(65) Prior Publication Data

US 2003/0071171 A1 Apr. 17, 2003

Related U.S. Application Data

(60) Provisional application No. 60/328,762, filed on Oct. 12, 2001.

(51) Int. Cl.$^7$ ............................. B64D 13/06; G08B 15/00
(52) U.S. Cl. .................................................. 244/118.5
(58) Field of Search ........................ 244/118.5; 89/1.11; G08B 15/00

(56) References Cited

U.S. PATENT DOCUMENTS

| | | | | |
|---|---|---|---|---|
| 3,680,499 A | * | 8/1972 | Boudreau | 244/118.5 |
| 4,282,870 A | * | 8/1981 | Porlier | 128/203.14 |
| 5,165,625 A | * | 11/1992 | Gutman | 244/118.5 |
| 5,348,000 A | * | 9/1994 | Teves | 128/204.18 |
| 5,791,982 A | * | 8/1998 | Curry et al. | 244/118.5 |
| 5,809,999 A | * | 9/1998 | Lang | 128/200.24 |

FOREIGN PATENT DOCUMENTS

| | | | | |
|---|---|---|---|---|
| FR | 2641397 A1 | * | 7/1990 | 244/118.5 |
| GB | 2183582 A | * | 6/1987 | 244/118.5 |
| GB | 2214681 A | * | 6/1989 | 244/118.5 |

* cited by examiner

Primary Examiner—Michael J. Carone
Assistant Examiner—Daniel Matz
(74) Attorney, Agent, or Firm—Clifford G. Frayne

(57) ABSTRACT

A pilot controlled relative analgesia system in which there would be located in the aircraft, possibly in the storage or luggage portion of the aircraft below the passenger deck, a pressurized source of gas capable of immobilizing individuals by placing them in a semi-conscious state, such gas including but not limited to nitrous oxide, and a control system positioned in the flight crew compartment either manual or electronic in nature for the deployment of the gas into the passenger portion of the airplane when a flight emergency in the form of a possible hijacking exists. The concentration level of nitrous oxide would be achieved and maintained until the flight crew with self-contained breathing apparatus could enter the passenger cabin and restrain and secure the appropriate individuals or alternatively maintain the level of nitrous oxide gas until the plane could be safely landed.

5 Claims, 1 Drawing Sheet

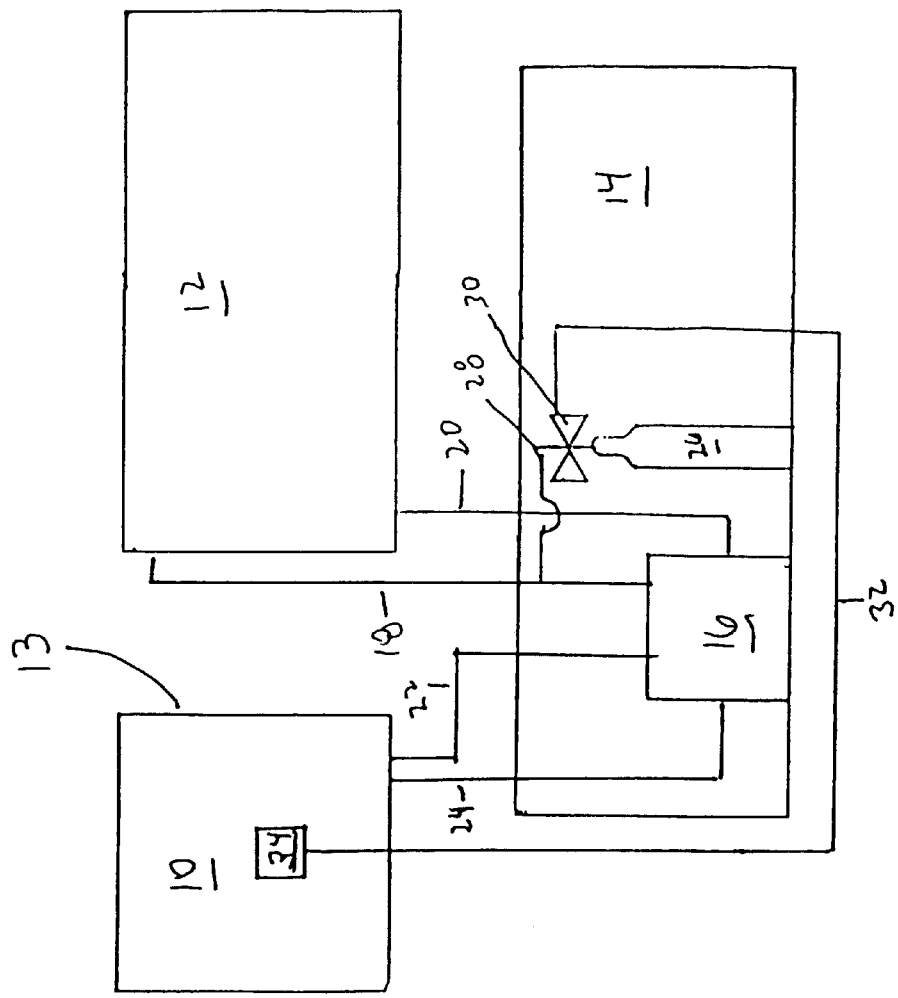

US 6,641,088 B2

PILOT CONTROLLED RELATIVE ANALGESIA SYSTEM FOR COMMERCIAL AIRLINES

RELATED APPLICATIONS

Applicant claims the benefit of provisional application Serial No. 60/328,762 filed Oct. 12, 2001.

BACKGROUND OF THE INVENTION

1. Field of the Invention

The present invention relates to a deterrent for the prevention of hijackings in general, and in particular, to a method to completely immobilize the passengers in the passenger cabin in the event of a significant threat to the aircraft or passengers without affecting the flight crew or flight crew compartment.

2. Description of the Prior Art

Airplane hijackings are oftentimes accomplished by the hijacker being able to threaten passengers or flight attendants in order to coerce the flight crew personnel to fly the plane to the hijacker's destination. Recent events indicate that the hijackers may now seek to commandeer the plane and actually take the flight controls for the hijacker's intended purpose. It is therefore imperative that airliners be designed such that the flight crew personnel can exercise some control over the passenger section of the aircraft without exiting the flight crew compartment, and it is further imperative that airliners be designed such that access to the flight crew compartment is denied to those individuals having intent to harm the flight crew personnel or commandeer the aircraft. The Applicant, a pediatric dentist, immobilizes or places individuals in a sedate state on a daily basis through the use of nitrous oxide (N2O) and oxygen (O2) in the dental operatory. The individual does not lose consciousness, but is placed in a semi-conscious state having virtually no motor faculties. Such a system installed to operate in the passenger section of an aircraft and controlled by the flight crew personnel would provide an inexpensive and effective means by which the flight crew personnel could control the passenger space from the flight crew compartment when an incident was in progress.

OBJECTS OF THE INVENTION

An object of the present invention is to provide for a novel deterrent to aircraft hijacking, which would allow the flight crew personnel to immobilize passengers in the passenger portion of the aircraft with the introduction of a pressurized gas, such as nitrous oxide.

A further object of the present invention is to provide for a novel deterrent to aircraft hijacking wherein the system allows the flight crew personnel to place the passengers into an immobilized semi-conscious state with virtually no motor faculties until the system is purged by the flight crew personnel.

A still further object of the present invention is to provide for a novel air craft hijacking deterrent which is easily installed on present aircraft and does not interfere with the normal operation of the aircraft.

SUMMARY OF THE INVENTION

A pilot controlled relative analgesia system in which there would be located in the aircraft, possibly in the storage or luggage portion of the aircraft below the passenger deck, a pressurized source of gas capable of immobilizing individuals by placing them in a semi-conscious state, such gas including but not limited to nitrous oxide, and a control system positioned in the flight crew compartment either manual or electronic in nature for the deployment of the gas into the passenger portion of the airplane when a flight emergency in the form of a possible hijacking exists. The concentration level of nitrous oxide would be achieved and maintained until the flight crew/air marshall with self-contained breathing apparatus could enter the passenger cabin and restrain and secure the appropriate individuals or alternatively maintain the level of nitrous oxide gas until the plane could be safely landed.

BRIEF DESCRIPTION OF THE DRAWINGS

These and other objects of the present invention will become evident particularly when taken in light of the following illustrations wherein:

FIG. 1 is a schematic diagram illustrating the system of the present invention as it relates to an aircraft.

DETAILED DESCRIPTION OF THE DRAWINGS

Commercial aircraft liners consist of three principle areas. The first area 10 is the flight crew compartment where the flight crew which actually fly and operate the aircraft are located. The second area is the passenger area 12 where the passengers and flight attendants are located during the flight. These two areas are separated by a bulkhead 13 which contains a secure door for entry and exit into the flight crew compartment. The baggage and storage area 14 is located generally beneath the passenger area 12. Located in the storage area 14 is the mechanical components consisting of pumps and blowers, etc., 16, which are utilized to circulate air into and out of the passenger compartment 12 via inlet conduits 18 and exhaust conduits 20, and to pressurize the aircraft. In Applicant's system, the circulation of air to and from the flight crew compartment 10 would be accomplished by a second separate conduit means, inlet conduit 22 and return or exhaust conduit 24.

There will be located in the storage area 14 a pressurized source of immobilizing gas, preferably nitrous oxide. This pressurized source 26 would be in conduit communication via conduit 28 with the inlet conduit 18 to the passenger compartment 12. A valve means 30 would be located on conduit 28, the valve means 30 being in electromechanical communication 32 with a control panel 34 located in the flight crew compartment 10. In this mode, if an event were to occur in the passenger compartment 12 which posed a significant threat to the aircraft or the passengers, a member of the flight crew located in the flight crew compartment 10 utilizing control means 34 could open valve 30 and introduce the gas (nitrous oxide) into the ventilation system. The deployment could be gradual or rapid depending upon the emergency situation. The control panel would be programmed such that the appropriate amount of nitrous oxide required at the particular level of the flight and pressurization of the cabin would be introduced into the passenger compartment.

The nitrous oxide acts as a relative analgesia to immobilize all of the individuals in the passenger area 12. By immobilization, the individuals are virtually deprived of their motor faculties, but remain conscious. The response is almost immediate and is relatively innocuous to other passengers. It does no damage to the aircraft and raises no significant health issues.

Analgesia is identified as the first stage of anesthesia. The second stage is the excitement phase, surgical anesthesia being identified as the third stage, and the fourth stage being respiratory paralysis/death. Within stage 1 anesthesia, there are three planes, 1, 2, and 3. Planes 1 and 2 are referred to as relative analgesia, while Plane 3 is total analgesia. Plane 1 analgesia can be obtained with a flow rate of 10–15 percent N2O to 85–90 percent O2. In this first plane of analgesia, respiration and muscularity are normal, the pupils react normally, pulse rate and blood pressure are normal, the individual is fully conscious but has obtained a feeling of relaxation and may feel a tingling in the extremities.

The second plane of analgesia can be obtained in a continuous flow system with a ratio between 27 percent N2O to 73 percent O2, and 35 percent N2O to 65 percent O2. In this state, the individual has a relaxed, far-away look, and is less aware of his immediate surroundings and less concerned with activity about him. The individual will also have a feeling of heaviness, lethargy and drowsiness, the pulse rate, blood pressure, respiration and muscularity remain normal.

The third plane of analgesia can be obtained with a continuous flow of a mixture of N2O and O2 in the ratio between 67 percent N2O to 33 percent O2 and 76 percent N2O to 24 percent O2. At this plane the individual has normal respiration, pulse and blood pressure. The individual may exhibit a sleepy look or a very hard stare. The individual begins to assume the appearance of unconsciousness and becomes totally unaware of his surroundings and body muscles may contract. The individual has no ability to interact with the surroundings.

The control panel 34 may be in communication with a plurality of probes located about the passenger compartment to provide readouts to the flight crew personnel as to the level of nitrous oxide in the cabin indicative of what analgesic plane has been achieved. In addition, the flight crew personnel can maintain a safe level of oxygen in the passenger cabin by monitoring information from these probes. This readout could be utilized by the flight crew personnel to determine their course of action. Wearing a self-contained oxygen breathing apparatus, flight crew personnel members could enter the passenger compartment and restrain the selected individuals. Alternatively the flight crew personnel could maintain a level of nitrous oxide in the passenger compartment while the flight crew personnel alerted ground control to the problem and the aircraft proceeded to the nearest airport for landing.

The system would also provide for a vent system which would allow the flight crew by means of the control panel to vent the nitrous oxide from the passenger cabin 12 once the emergency situation had been controlled.

While the present invention has been described with respect to the exemplary embodiments thereof, it will be recognized by those of ordinary skill in the art that many modifications or changes can be achieved without departing from the spirit and scope of the invention. It is manifestly intended that the invention be limited only by the scope of the claims and the equivalence thereof.

I claim:

1. A relative analgesia system for passenger aircraft to thwart violence or hijacking, said system comprising:
    a reservoir of analgesia gas positioned in an air craft exterior the passenger compartment and in communication with a passenger compartment air circulation system;
    a valve means for introduction of said analgesia gas to said air circulation system;
    a flight compartment control means in communication with said valve means for selectively introducing said analgesia gas into said passenger compartment air circulation system; and
    flight compartment monitoring means to monitor the level of said analgesia gas in said passenger compartment air circulation system.

2. The relative analgesia system in accordance with claim 1 wherein a series of probes are positioned in said passenger compartment and in communication with said control means for monitoring the level of said analgesia gas.

3. The relative analgesia system in accordance with claim 2 wherein said analgesia gas is nitrous oxide.

4. A method of thwarting or deterring violence of hijacking of a passenger air liner comprising the steps of:
    providing a first air circulation system for a passenger compartment, and a second air circulation system for a flight crew compartment;
    positioning a reservoir of analgesia gas exterior the passenger compartment and in communication with said air circulation system of said passenger compartment;
    providing a valve means between said reservoir of analgesia gas and said air circulation system of said passenger compartment;
    positioning a control means in said flight crew compartment, said control means in communication with said valve means introducing analgesia gas into said air circulation system of said passenger compartment;
    monitoring level of said analgesia gas in said air circulation system of said passenger compartment to attain a level of relative analgesia;
    maintaining level of relative analgesia as required.

5. The method of thwarting or deterring violence in accordance with claim 4 wherein said analgesia gas is nitrous oxide.

\* \* \* \* \*